(12) United States Patent
Sundar

(10) Patent No.: US 11,917,431 B2
(45) Date of Patent: *Feb. 27, 2024

(54) CONNECTED VEHICLE NETWORK DATA TRANSFER OPTIMIZATION

(71) Applicant: Faraday&Future Inc., Gardena, CA (US)

(72) Inventor: Shyam Sundar, San Diego, CA (US)

(73) Assignee: Faraday&Future Inc., Gardena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,074

(22) Filed: Mar. 6, 2023

(65) Prior Publication Data

US 2023/0284049 A1 Sep. 7, 2023

Related U.S. Application Data

(63) Continuation of application No. 16/536,258, filed on Aug. 8, 2019, now Pat. No. 11,601,825.

(60) Provisional application No. 62/716,070, filed on Aug. 8, 2018.

(51) Int. Cl.
*H04W 24/02* (2009.01)
*G06N 3/04* (2023.01)
*G06N 3/08* (2023.01)
*H04W 4/44* (2018.01)
*H04W 72/12* (2023.01)

(52) U.S. Cl.
CPC ............ *H04W 24/02* (2013.01); *H04W 4/44* (2018.02); *H04W 72/12* (2013.01); *G06N 3/04* (2013.01); *G06N 3/08* (2013.01)

(58) Field of Classification Search
CPC ... H04W 24/02; H04W 72/1205; H04W 4/44; G06N 3/04
See application file for complete search history.

(56) References Cited

U.S. PATENT DOCUMENTS

| 8,848,608 B1* | 9/2014 | Addepalli | H04W 48/18 370/401 |
| 8,862,966 B2* | 10/2014 | Nygren | G06F 13/4243 714/775 |
| 10,218,639 B2* | 2/2019 | Kandula | H04L 47/72 |
| 10,846,788 B1* | 11/2020 | Klein | H04L 47/83 |
| 10,924,503 B1* | 2/2021 | Pereira | H04L 63/20 |
| 2005/0090275 A1* | 4/2005 | Wang | H04W 48/18 455/512 |
| 2005/0255856 A1* | 11/2005 | Griffin | H04W 36/32 455/427 |
| 2008/0214210 A1* | 9/2008 | Rasanen | H04W 4/029 455/456.3 |

(Continued)

*Primary Examiner* — Parth Patel
(74) *Attorney, Agent, or Firm* — Knobbe, Martens, Olson & Bear LLP

(57) ABSTRACT

Generally described, one or more aspects of the present application correspond to techniques for dynamic management of the timing of data transfer between a connected vehicle and a remote computing system. For example, during navigation a connected vehicle may switch between connections to a number of different networks, each having different parameters (cost, bandwidth, quality, etc.). The disclosed techniques can use inputs including vehicle location, available networks, and data transfer timing requirements to optimize data transfer with respect to one or more of these parameters.

20 Claims, 4 Drawing Sheets

(56) References Cited

U.S. PATENT DOCUMENTS

| | | | |
|---|---|---|---|
| 2010/0041397 A1* | 2/2010 | Chutorash | H04W 48/18 455/67.11 |
| 2012/0015655 A1* | 1/2012 | Lee | H04W 8/02 455/435.1 |
| 2012/0150444 A1* | 6/2012 | Hong | G01C 21/3461 701/400 |
| 2013/0024107 A1* | 1/2013 | Xie | H04W 4/029 701/423 |
| 2013/0196621 A1* | 8/2013 | Guday | H04L 43/0876 455/406 |
| 2013/0219039 A1* | 8/2013 | Ricci | G06F 3/0488 709/223 |
| 2013/0304616 A1* | 11/2013 | Raleigh | H04M 15/66 705/34 |
| 2013/0322329 A1* | 12/2013 | Visuri | H04W 48/20 370/328 |
| 2014/0050085 A1* | 2/2014 | Hong | H04L 47/821 370/230 |
| 2014/0222950 A1* | 8/2014 | Rabel | G01C 21/3896 709/217 |
| 2015/0026312 A1* | 1/2015 | Othmer | H04W 48/18 709/220 |
| 2015/0156662 A1* | 6/2015 | Bai | G08G 1/163 370/231 |
| 2015/0365884 A1* | 12/2015 | Ljung | H04W 48/16 455/436 |
| 2016/0150451 A1* | 5/2016 | Barreto De Miranda Sargento | H04W 36/30 370/332 |
| 2016/0300493 A1* | 10/2016 | Ubhi | G08G 5/0082 |
| 2017/0055185 A1* | 2/2017 | Chaudhuri | H04W 36/0085 |
| 2017/0208540 A1* | 7/2017 | Egner | H04W 64/003 |
| 2018/0018159 A1* | 1/2018 | Eller | H04W 12/10 |
| 2018/0183650 A1* | 6/2018 | Zhang | H04W 72/21 |
| 2018/0308025 A1* | 10/2018 | Bansal | G06N 3/02 |
| 2019/0011934 A1* | 1/2019 | DeBitetto | G01C 21/005 |
| 2019/0080232 A1* | 3/2019 | Choi | G06N 3/105 |
| 2019/0086217 A1* | 3/2019 | Ibrahim | H04W 88/02 |
| 2019/0099653 A1* | 4/2019 | Wanke | A63F 13/828 |
| 2019/0149417 A1* | 5/2019 | Augusto Lopes | H04L 41/0886 370/254 |
| 2019/0190703 A1* | 6/2019 | Lekkas | H04L 9/0825 |
| 2019/0283709 A1* | 9/2019 | Lu | H04N 7/183 |
| 2019/0392321 A1* | 12/2019 | Weng | G06N 3/082 |
| 2020/0053577 A1* | 2/2020 | Sundar | H04W 24/02 |
| 2020/0100080 A1* | 3/2020 | Mladin | H04W 4/70 |
| 2020/0219334 A1* | 7/2020 | Emmerling | B60L 58/12 |
| 2020/0229065 A1* | 7/2020 | Iwata | H04W 4/44 |
| 2020/0234582 A1* | 7/2020 | Mintz | G08G 1/096811 |
| 2020/0236614 A1* | 7/2020 | Hedberg | H04W 8/24 |
| 2020/0334764 A1* | 10/2020 | Fleck | G06Q 10/20 |
| 2020/0410346 A1* | 12/2020 | Rappoport | G06N 3/04 |
| 2020/0413139 A1* | 12/2020 | Ickin | H04N 21/2187 |
| 2021/0168584 A1* | 6/2021 | Li | H04W 48/20 |
| 2021/0195381 A1* | 6/2021 | Ling | H04W 76/40 |
| 2021/0243274 A1* | 8/2021 | Thomas | H04W 4/40 |

\* cited by examiner

CONNECTED VEHICLE NETWORK DATA TRANSFER OPTIMIZATION

CROSS-REFERENCE TO RELATED APPLICATIONS

This application claims the benefit of U.S. Provisional Application No. 62/716,070, filed Aug. 8, 2018, the entirety of which is hereby incorporated by reference.

TECHNICAL FIELD

The systems and methods disclosed herein are directed to connected vehicles, and, more particularly, to a network data optimizer that manages timing of connected vehicle data transfer via available networks.

BACKGROUND

Vehicle connectivity platforms have arisen with the emergence of connected infotainment systems (e.g., connected navigation, social media, music streaming, and in-car Wi-Fi) and the accompanying vehicle applications. A connected vehicle can use any of a number of different communication technologies to communicate with computing devices within the vehicle, other vehicles on the road, roadside infrastructure, and remote computing resources. For example, data can be transmitted from or received by a connected vehicle over networks including Bluetooth, satellite connections, WiFi, and 4G/5G.

SUMMARY

The connected vehicle data transfer management techniques disclosed herein have several features, no single one of which is solely responsible for its desirable attributes. Without limiting the scope as expressed by the claims that follow, certain features of the data transmission management will now be discussed briefly. One skilled in the art will understand how the features of the disclosed data transmission management provide several advantages over traditional systems and methods.

One aspect relates to a connected vehicle networking system, comprising a vehicle including at least one transceiver configured to connect to a plurality of networks, and a computing system configured to execute an application and a network data optimizer; and at least one server remote from the vehicle and configured to transfer data with the application; wherein the network data optimizer is configured by computer-executable instructions to act as an intermediary between the application and the at least one server by at least determining a data transfer window for transferring data between the application and the least one server; identifying at least a first network and a second network to which the at least one transceiver can connect during the data transfer window; determining a first cost of transferring data using the first network and a second cost of transferring data using the second network; identifying which of the first cost and the second cost is a lowest cost; and instructing the application to transfer data with the at least one server when the at least one transceiver is connected to the one of the first and second networks corresponding to the lowest cost.

In some embodiments, the network data optimizer can comprise a deep learning model trained to predict optimal data transfer start and stop timings.

Another aspect relates to a computer-implemented method, comprising determining a data transfer window for transferring data between an application executing on a computing system of a vehicle and at least one server remote from the vehicle; identifying at least a first network and a second network to which the vehicle can connect during the data transfer window; determining a first cost of transferring data using the first network and a second cost of transferring data using the second network; identifying which of the first cost and the second cost is a lowest cost; and instructing the application to transfer data with the at least one server when the vehicle is connected to the one of the first and second networks corresponding to the lowest cost.

In some embodiments, the computer-implemented method can further comprise analyzing a navigational route of the vehicle to identify the first and second networks. In some embodiments, the computer-implemented method can further comprise instructing the application to transfer the data based additionally on determining that a priority of transferring the data exceeds the lowest cost.

DETAILED DESCRIPTION

Figure 1:
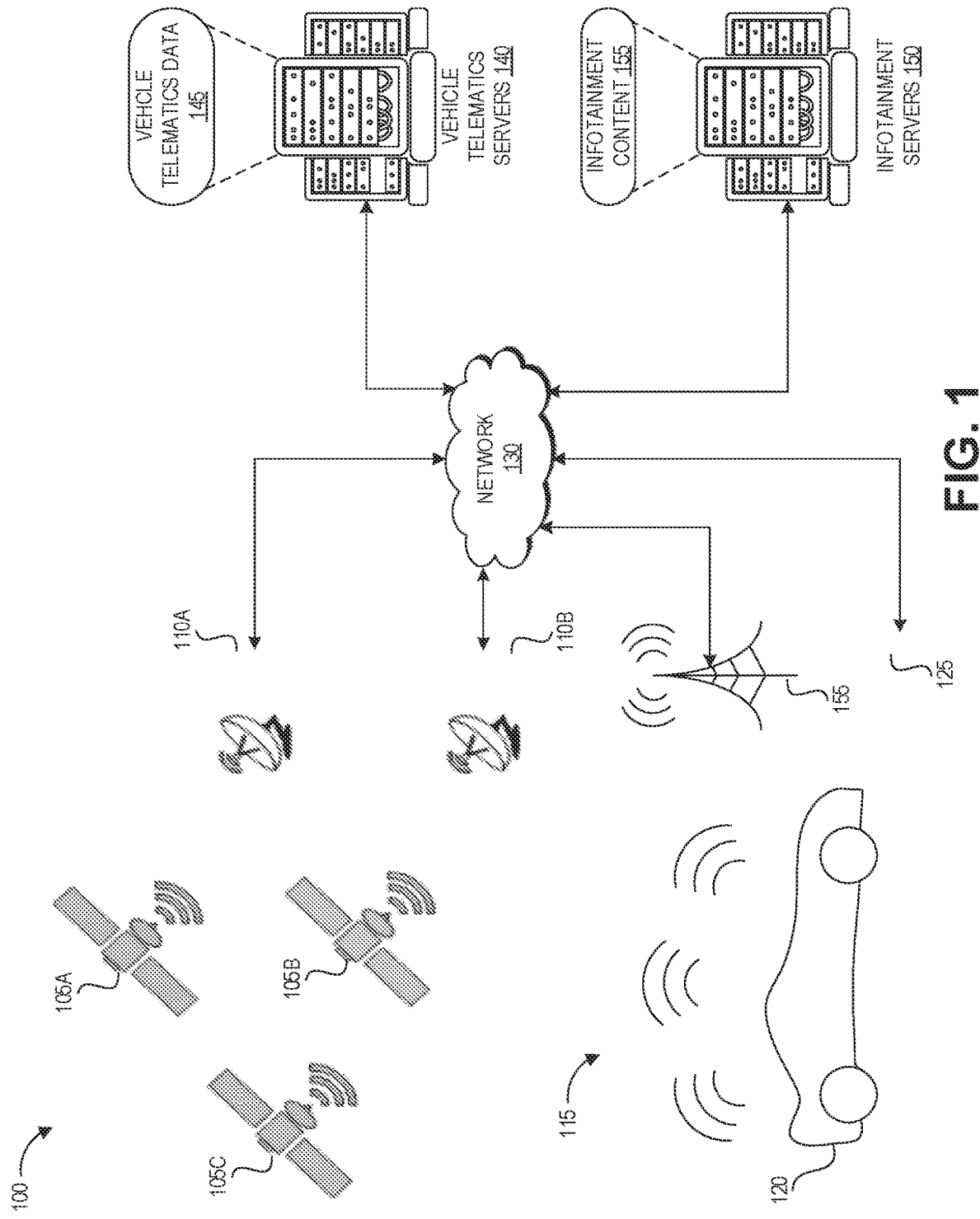
FIG. 1 depicts a schematic diagram of a networked connected vehicle communication environment in which various embodiments according to the present disclosure can be implemented.

Generally described, the present disclosure relates to the dynamic management of data transfer to and from a connected vehicle, for example to optimize various goals including minimizing cost of data transfer and complying with specified timing windows for data transfer. A connected vehicle can generate significant amounts of manufacturer-specific vehicle diagnostics and performance data that the vehicle manager may wish to collect and analyze. Connected vehicles can also receive software images, applications and calibration settings via over-the-air updates. These vehicle manager bulk data transfers typically use WiFi or satellite connection or cellular data (e.g., 4G/LTE) networks. In addition, user-initiated data transfers such as streaming music, voice searches, web browsing, and the like can also use WiFi, cellular data, or satellite connection networks (referred to collectively herein as "wireless networks"). Commonly, with connected vehicles the user pays for the network bandwidth that they use for user-initiated data transfer, and the vehicle manager pays for the network bandwidth used for their data transfers both to and from the vehicle. A connected vehicle often travels through many different networks as it navigates, and certain types of data (e.g., battery state information, vehicle system diagnostics) may have specified transmission intervals that occur during navigation. Since satellite data connections can be expensive, the vehicle manager data transfers may become quite expensive, particularly across a large fleet of vehicles.

The aforementioned problems, among others, are addressed in some embodiments by the disclosed techniques for dynamically optimizing the timing and/or network used for transmitting various classes of data. Certain classes of data may be delivered in real time (e.g., as a user of the vehicle is interacting with the vehicle applications), such as user-requested streaming of media content and real-time navigation. However, transfer for other classes of data may be deferred, either until a specific deadline or indefinitely. For such data classes, the disclosed techniques can use predictive analysis to identify a point in time during the acceptable data transfer window at which the data transfer cost is expected to be low (or the lowest). In addition, the predictive analysis can identify times at which the cost of data transfer is expected to increase, for example raising before again lowering. These predictions can be used to drive the timing of data transfer starts and stops.

Some implementations may use predictive logic to determine start and stop timings for data transfers to minimize cost while complying with timing requirements, as described herein. Some implementations can use a trained deep learning algorithm to predict the start and stop timings for data transfers to minimize cost while complying with timing requirements. These approaches are referred to herein as a "network data optimizer." The network data optimizer can receive a number of inputs to use in making start/stop timing predictions, including but not limited to including time-of-day, time-zone, vehicle geo-position, available networks, business logic, network cost structures (including any business relationship modifiers), and the like. In some implementations, some or all vehicle applications can be programmed to comply with the start/stop timing recommendations output by the network data optimizer. In some implementations, some or all vehicle applications can be programmed to evaluate the timing recommendations and determine whether or not to comply. For example, vehicle manager applications can be programmed to comply, while user applications need not necessarily comply.

For example, during the course of driving, a connected vehicle may roam between multiple wireless networks, which could impose different costs on the vehicle manager. The cost of the data transfer could also differ by time of day, network load factors, business relationships between the vehicle manager and various network providers, and other factors. For example, some wireless carriers can have different rates for business hours (e.g., 9 AM-5 PM) and non-business hours (e.g., 5 PM-9 AM), with costs being lower during non-business hours. It can be cost-advantageous for the vehicle manager to defer the non-critical data transfers until after 5 PM. Another example is that a wireless carrier may charge a higher data price in an urban region than in a rural region that is just adjacent to the urban region. Hence, it can be cost-advantageous for the vehicle to defer non-critical data transfers until the vehicle enters the rural region. The disclosed predictive data transfer management can balance the goal of the vehicle manager to achieve the lowest possible cost for all their data transfers, while also complying with specified transfer timings or intervals for various data classes.

As would be appreciated by one of skill in the art, the use of dynamic data transfer timing predictions, as disclosed herein, represents a significant technological advance over prior implementations. Specifically, the disclosed data transfer timing management can enable a connected vehicle that has access to multiple wireless networks throughout the course of navigation to adaptively select from among those networks to optimize certain goals, while still complying with specified data transfer timing requirements. For example, the disclosed techniques can be implemented to predict the networks that will be available during a timing window for a particular data transfer, to identify which of those networks to use for the transfer, and to send start and/or stop signals to the application requesting the transfer accordingly. As such, the embodiments described herein represent significant improvements in computer-related technology.

As described herein, data transfer refers to both transmitting data from a connected vehicle over a network and receiving data at the connected vehicle over a network. Although certain examples discussed herein present the goal of minimizing cost of data transfer, it will be appreciated that the timing prediction techniques can be tuned to optimize one or more of various goals, including cost, reliability, and time of data transfer, usage of a particular type of network, and the like. As described herein, a "vehicle manager" can be the entity that designs, manufactures (or commissions manufacture of) the vehicle, and also makes use of the networked vehicle systems (e.g., for providing software/firmware updates, receiving vehicle diagnostic information, scheduling maintenance, etc.) after the vehicle is in use by a consumer. However, it will be appreciated that in some implementations the entity that makes use of the vehicle's networked systems as described herein may differ from the vehicle designer and/or manufacturer.

Various aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are ti illustrate only, and are not intended to be limiting. For example, although described in the context of a connected vehicle, the disclosed data transfer optimization techniques can be implemented in other mobile networked computing environments.

Overview of Example Connected Vehicle and Network Environment

FIG. 1 depicts a schematic diagram of a networked connected vehicle communication environment 100 in which various embodiments according to the present disclosure can be implemented. FIG. 1 depicts a connected vehicle 120, which may be a car (as illustrated) or a truck, van, aerial vehicle, boat, train, or other vehicle. The vehicle 120 may be an electric vehicle in some implementations, or may be a hybrid vehicle, hydrogen vehicle, or combustion vehicle.

The vehicle 120 can be configured to establish a number of different types of wireless network connections 115, including satellite connections, cellular data connections, and WiFi connections. For example, the vehicle 120 can be equipped to connect to geosynchronous satellites 105A, low-earth orbit satellites 105B, global navigation satellite systems 105C, cellular base station transceivers 155 (e.g., for 3G, 4G, LTE, and/or 5G cellular network access), and WiFi access points 125, as they are available. In turn, the geosynchronous satellites 105A and low-earth orbit satellites 105B can communicate with gateways 110A, 110B that provide access to the network 130. The global navigation satellite systems 105C can communicate directly with the vehicle 120, for example to triangulate (or otherwise compute) its location. These various satellite, cellular, and WiFi network connections can be managed by different third-party entities, referred to herein as "carriers." The vehicle manager can be charged various pricing schemes by these carriers for usage of their networks for data transfer, as described herein.

The vehicle 120 can use these various connections 115 to communicate over network 130 with remote computing resources such as the vehicle telematics servers 140 and infotainment servers 150. The network 130 can include any appropriate network, including an intranet, the Internet, a cellular network, a local area network or any other such network or combination thereof. In the illustrated embodiment, the network 130 is the Internet. Protocols and components for communicating via the Internet or any of the other aforementioned types of communication networks are known to those skilled in the art of computer communications and thus, need not be described in more detail herein.

The vehicle telematics servers 140 can store and analyze vehicle telematics data 145, for example diagnostic data received from the vehicle 120 and other vehicles. In some implementations, the vehicle telematics servers 140 can be maintained and securely stored by the vehicle manager. Beneficially, analysis of the vehicle telematics data 145 can enable the vehicle manager to provide improved vehicle service, vehicle software and/or firmware upgrades, and aid in further vehicle design. Accordingly, the vehicle manager can desire for certain telematics data to be provided from the vehicle 120 to the vehicle telematics servers 140 at their own cost (e.g., without charging the owner or user of the vehicle 120). This data may be specified for transfer at predefined intervals, before certain deadlines, or without any data transfer timing limitations.

The infotainment servers 150 can store infotainment content 155, for example media that provides a combination of information and entertainment. This media can include, for example, music, movies, podcasts, news, and other broadcast material that may be of interest to vehicle users. This content can be provided on demand to users of the vehicle 120. This data may be provided at predefined intervals (e.g., sending predicted interesting news articles), or may be delivered in real-time (e.g., on demand as requested by a user). In some implementations, user-requested on-demand data may not be regulated using the disclosed network data optimization techniques, as the transfer start and stop may be dictated by a user of the vehicle.

Figure 2:
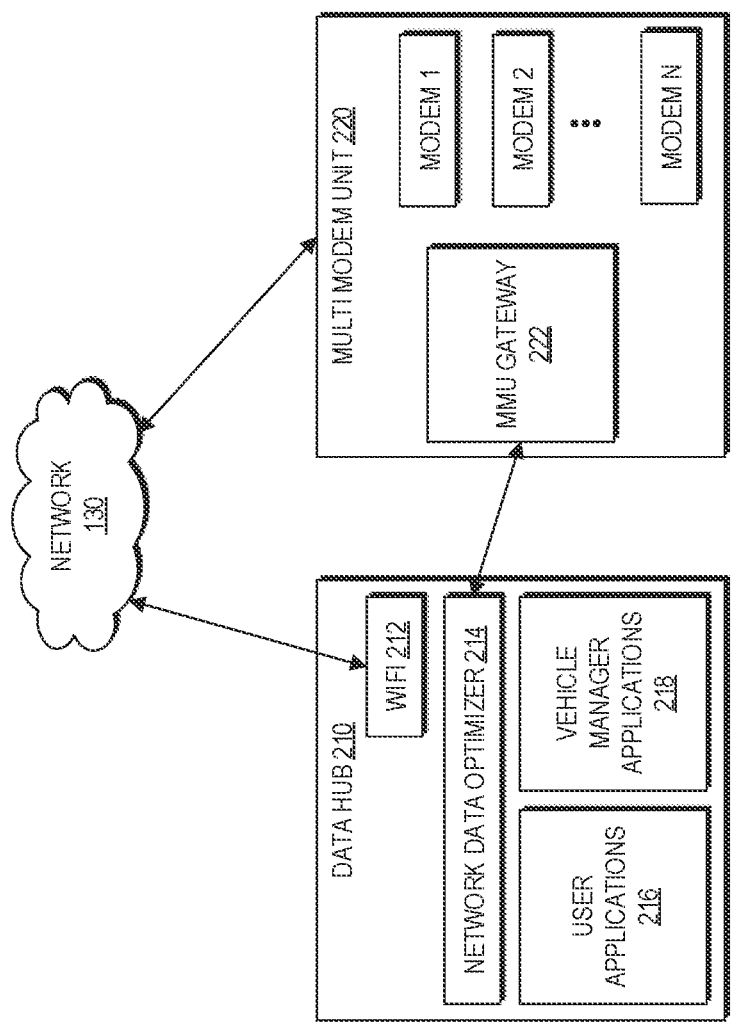
FIG. 2 depicts a block diagram of example networking components of the connected vehicle of FIG. 1.

FIG. 2 depicts a block diagram of example networking components of the connected vehicle 120. In the illustrated embodiment, the data hub 210 and multi-modem unit 220 represent two computing components that can enable the vehicle 120 to connect to the network 130, for example via the satellites 105A, 105B and/or WiFi access point 125 of FIG. 1. Specifically, the data hub 210 includes a WiFi transceiver 212 that can be configured to identify and connect to available WiFi networks. The multi-modem unit 220 includes a number of different modems (modem 1, 2 . . . N) that can connect to various satellite networks, for example cellular communication networks. The multi-modem unit gateway 222 can regulate communications sent along the modems, for example routing data packets to the appropriate modem, converting data formats, etc. As such, the vehicle 120 can be connected to multiple networks simultaneously, further enabling the disclosed techniques for optimizing network selection during data transfer.

The data hub 210 also includes a number of user applications 216, vehicle manager applications 218, and the disclosed network data optimizer 214. User applications 216 can include infotainment applications such as media streaming, real time traffic visualization, and network browsing, to name a few examples. Vehicle manager applications 218 can include software and firmware that manages and monitors vehicle systems, for example by performing diagnostics of various vehicle systems, maintaining vehicle software, and the like. The network data optimizer 214, as described herein, can manage the timing of data transfer for some or all of the user applications 216 and the vehicle manager applications 218 in order to optimize specified network-usage goals (e.g., cost, reliability, and/or transfer speed).

Figure 3:
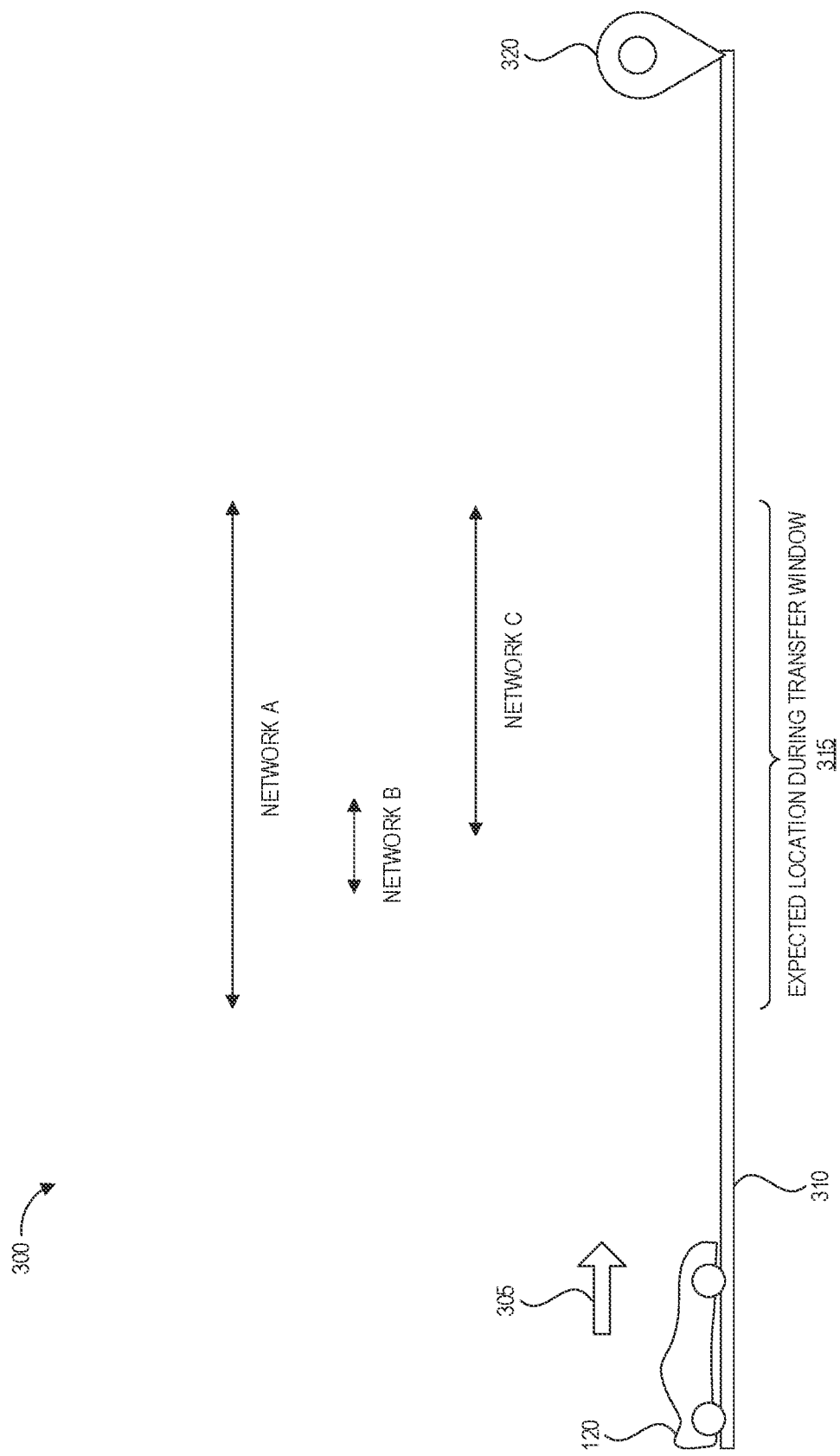
FIG. 3 is a graphical illustration of an environment in which the disclosed data transfer timing management techniques can be implemented.

FIG. 3 is a graphical illustration of a navigational environment 300 in which the disclosed data transfer timing management techniques can be implemented. In FIG. 3, the vehicle 120 is traveling along a route 310 to a destination 320. For example, in some implementations a user may have entered a destination in a map application of an onboard vehicle computer (or another device communicating with the vehicle), so the vehicle's computing systems (e.g., the network data optimizer 214) can know the intended roads on which the vehicle 120 will be traveling. In other scenarios the network data optimizer 214 may predict a trajectory 305 of the vehicle, for example based on historical navigational data. In addition, the vehicle's computing systems can know the current (and optionally trending) speed of the vehicle, speed limits (or speed trends) of the roads that will be navigated, and current/predicted traffic conditions. This information can be used to compute the expected location 315 during the data transfer window for a particular application. This expected location 315 may be computed in advance of the vehicle 120 reaching that location and updated as the vehicle progresses, or may be computed based on the current location of the vehicle at the start of the data transfer window.

As illustrated, three different networks (network A, network B, and network C) can be available in the expected location 315 of the vehicle 120 during the data transfer window. Each network can have associated costs, and these costs may differ from one another. As such, the network data optimizer 214 can use the disclosed techniques to identify the network (or combination of networks) that will complete the data transfer in compliance with the timing requirements while also minimizing the cost of data transfer. For example, network A may be available during the entire window, while networks B and C may be available for partially overlapping subsets of the window. If network B is the cheapest, the network data optimizer 214 can determine to transfer the data when the vehicle 120 connects to network B. However, the data transfer may take more time than the vehicle has during its connection to network B. As such, the network data optimizer 214 may combine the usage of network B with the cheaper of networks A and C, for example starting the data transfer some period of time into the connection with network A such that it will complete at or near the end of the connection with network B, or starting the data transfer when the vehicle 120 connects to network B and completing the data transfer using network C. This non-limiting example presents the scenario of three available networks, however in implementation greater or fewer networks may be available during the data transfer window, and some networks may be intermittently available during the data transfer window. The description of FIG. 4 below provides additional details regarding the techniques used by the network data optimizer 214 for selecting particular networks and/or data transfer timing.

Overview of Example Network Data Optimizer

Figure 4:
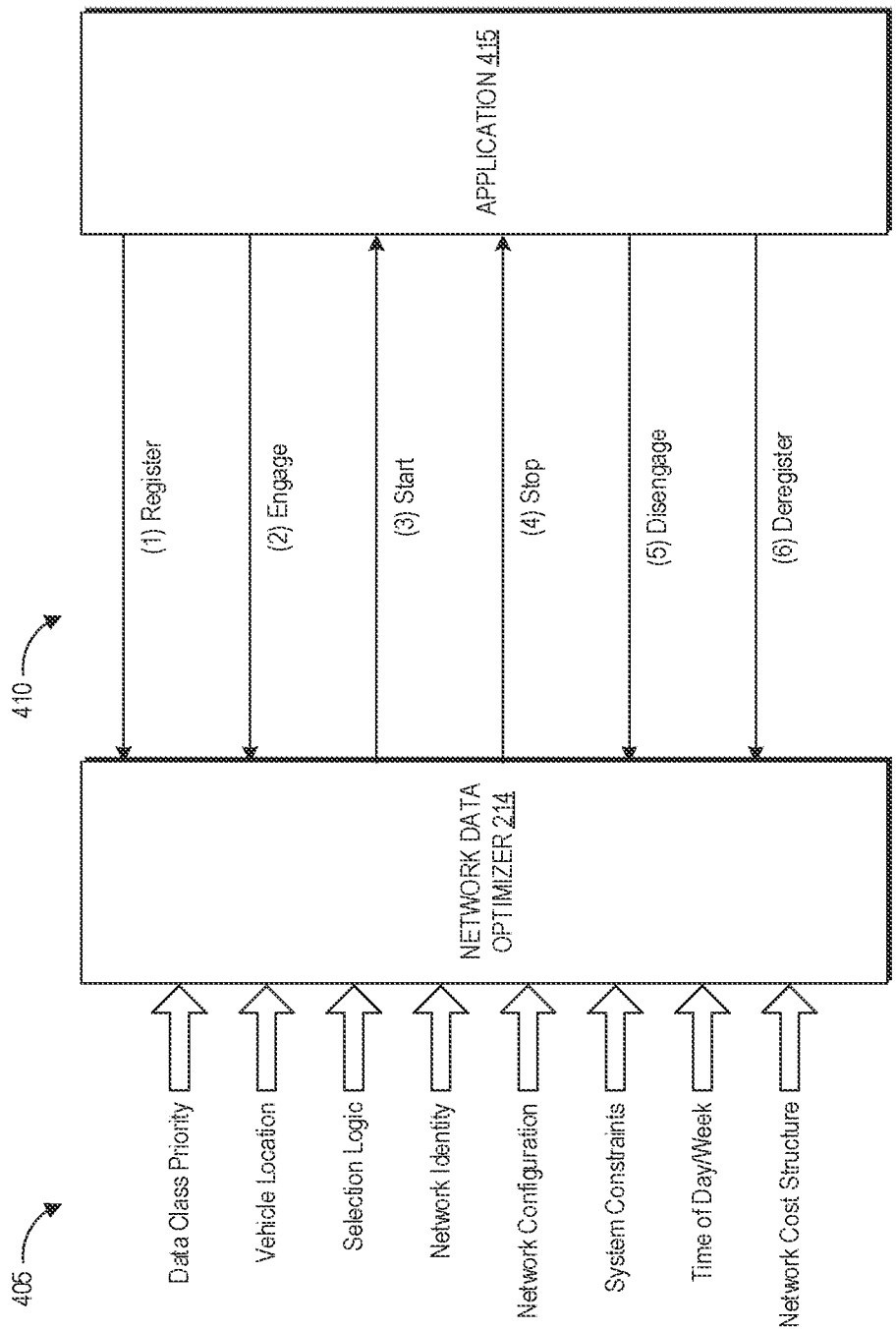
FIG. 4 depicts a block diagram of an example network data optimizer for use in the networking components of FIG. 2.

FIG. 4 depicts a block diagram of an example of the network data optimizer 214 of FIG. 2. The depicted network data optimizer 214 can be a set of computer-executable instructions stored in one or more physical memories, implemented by one or more hardware processors. In some implementations, the instructions of the network data optimizer 214 can be periodically or intermittently updated via vehicle manager software update data transfers, as described herein.

FIG. 4 depicts an illustrative set of interactions 410 for management of data transfer timing, as described herein. These interactions 410 represent data communications between the network data optimizer 214 and a particular software or firmware application 415 that has (or expects to have) data to transfer. Though FIG. 4 only depicts a single application 415, it will be appreciated that the interactions 410 can occur between the network data optimizer 214 and some or all of the user applications 216 and vehicle manager applications 218. In some implementations, certain applications of the user applications 216 and vehicle manager applications 218 that implement real-time data transfers may not communicate with the network data optimizer 214.

At interaction (1), the application 415 registers with the network data optimizer 214. An application can register when its instructions indicate that it will have data to transfer (e.g., that it will have data to transmit from the vehicle, or that it has received an alert that it will receive a data transmission to the vehicle). This registration can include, for example, provision to the network data optimizer 214 of the data class, priority, data transfer deadline, and data transfer tolerance of the application 415. In this manner, each application 415 communicate their parameters to the network data optimizer 214. With respect to the data class, a class refers to a type or category of data (e.g., battery parameters, motor performance, tire pressure, and other vehicle diagnostic information; software updates, firmware upgrades, new software applications). The network data optimizer 214 can maintain a database of data classes and associated data priorities. The data priorities can be values representing the relative benefit or cost associated with transferring (or not transferring) the data. As an example, transmission of a new radio application to the vehicle may have a low priority, as it would not cause harm if it did not get to the vehicle user soon. However, transmission of battery parameters can have high priority, as remote analysis of the battery parameters could prevent electrical fault and/or real cost (e.g., vehicle damage, an unhappy user). In some implementations, the data priorities can be specified by a central authority or the vehicle manager and provided securely to the network data optimizer 214, such that a user of the vehicle and/or the application 415 are not able to access (or be aware of) the priorities of different data classes. For example, the {data class, priority value} pairings database can be encrypted, stored in a secure chip such as a trusted platform module (TPM), or stored in another suitable secure manner such that only the network data optimizer 214 is authorized to access the database. In some implementations, whenever the value of data exceeds the cost of the network, the network data optimizer 214 can send a "Start" signal to send it out. Whenever the cost of the network exceeds the value of the data, the network data optimizer 214 can send a "Stop" signal to stop the transfer.

With respect to the data transfer deadline and tolerance, the deadline refers to a recurring interval or known time at which data transfer from that application 415 is specified to occur, while the tolerance refers to an amount of time (or percentage of the interval) on either side of the deadline during which data transfer is acceptable. As a non-limiting example, a data class of "battery parameters" (e.g., battery charge level, battery temperature, discharge rate) can have a deadline of transfer at five minute intervals with a tolerance of plus or minus ten seconds. As such, the battery parameter data class can be transferred during a twenty second window occurring every five minutes. As another non-limiting example, a data class of "firmware upgrade" can have a deadline of "within the next week," with no associated interval. As another non-limiting example, a data class of "user interface update" can have a no deadline or associated interval. It will be appreciated that actual data classes and associated deadlines/intervals can vary from the provided examples. In response to registering, the application 415 can receive an identity or "handle" back from the network data optimizer 214, so that the network data optimizer 214 can send start and stop signals associated with that identifier.

At interaction (2), the application 415 can engage with the network data optimizer 214. For example, the application 415 can engage when it has data ready to transfer, or at the beginning of its applicable data transfer window. In scenarios where there is an applicable data transfer window, engagement of the application 415 can start a counter at the network data optimizer 214 corresponding to the length of the window. The application can remain engaged until the data is transferred or the expiry of the counter (at which point the data can be transferred), in some implementations.

At interaction (3), the network data optimizer 214 sends a "start" signal to the application 415 indicating that it should begin data transfer, for example when the right network (e.g., lowest cost, most reliable, fastest, etc.) is entered during the applicable window. At interaction (4), the network data optimizer 214 sends a "stop" signal to the application 415 indicating that it should stop data transfer, for example when the right network is exited. In some implementations no stop signal may be sent during the timeframe of data transfer. In some implementations, a stop signal may always be sent when the network changes to an unfavorable network. However, the application 415 may have already completed its data transfer before the stop signal is sent, in which case the stop signal does not require any action from the application 415. In some implementations two or more cycles of start/stop signals may be sent, such that the application 415 performs its data transfer in multiple chunks. The application 415 can be programmed to comply with the start and stop signals from the network data optimizer 214, or may be programmed to evaluate whether to proceed with start or stop despite the signals from the network data optimizer 214.

The network data optimizer 214 can be programmed to send start (and optionally stop and additional start signals) such that the application 415 is instructed to send its data packet during the specified timeframe (e.g., before expiry of the counter). In some implementations, this can factor in the size of the data packet and network transfer speeds, such that the application 415 is instructed to send its data to a destination (e.g., the vehicle telematics servers 140) such that it arrives at the destination during the specified timeframe.

At interaction (5), the application 415 disengages with the network data optimizer 214. The application 415 can disengage when its data transfer is complete. In some scenarios, after disengaging the application 415 can remain registered and return to interaction (2) to re-engage for another data transfer. This behavior can be exhibited, for example, by applications that have data to transfer periodically. In some scenarios, after disengaging the application 415 can initiate interaction (6) to deregister. Deregistration can cause the network data optimizer 214 to remove the application information from its memories. The application 415 may deregister, for example, if it has only a single data transfer scheduled for completion.

FIG. 4 also depicts example inputs 405 into the network data optimizer 214 for use in sending the start and stop signals. The inputs 405 can include data class priority (for the particular data class of each application 415), vehicle location, selection logic, network identity (e.g., which of a number of known networks are currently available, or are predicted to be available during the applicable data transfer window), network configuration (e.g., the type, bandwidth, speed, and/or carrier of the network), system constraints, time of the day or week, and network cost structure. Selection logic can be logic driven by business relationships and parameters. To illustrate, a vehicle manager may have a business relationship with a certain franchise (e.g., a common coffee shop) that allows its vehicles to transfer data for free over their WiFi, while this same relationship may not apply to other establishments with WiFi. System constraints may be technical issues such as storage space. If storage is getting full, the vehicle may be forced to empty data from the storage (or at least partially empty the storage) by transferring data even though the vehicle is connected to a more expensive network. The selection logic can dictate use of the free WiFi at the certain franchise, can represent the data transfer preferences resulting from other such business relationships, can account for current network cost structures, and can also accommodate system constraints.

With respect to network cost structure, the network data optimizer 214 can include a database or mapping of known available data transfer networks and their associated cost(s). For example, some networks may have fixed costs for data transfer, while the cost of using some networks can vary according to certain parameters including time of day, day of the week, promotionals, special business relationships between the vehicle manager and the network carrier, region of access to the network, and type/amount of data transferred, to name a few examples. The network data optimizer 214 can be provided with and maintain an updated database reflecting these costs. In some implementations, other network usage parameters can be optimized by the network data optimizer 214 instead of or in addition to cost, and such parameters may be maintained by the network data optimizer 214.

The network data optimizer 214 can use the inputs and its timing prediction logic (for example, programmed selection algorithm or a trained deep neural network) to determine when to send the start and stop signals to each engaged application. For example, returning to the example of FIG. 3, the network data optimizer 214 can analyze the route 310, identify the expected location 315 of the vehicle 120 during the applicable data transfer window, determine that networks A, B, and C will be available during this window, and select the least expensive one (or combination) of these networks for initiating and/or completing the data transfer. As such, the network data optimizer 214 functions as a third party arbitrator between the applications 415 and the network hardware (e.g., WiFi transceiver 212, modems 1-N).

In some implementations, the network data optimizer 214 can weigh data priority versus network cost continuously, periodically, and/or when different network changes are detected. The network data optimizer 214 can then instruct some or all applications whose data priority outweighs the current network cost to start their data transfers. The network data optimizer 214 can also instruct some or all applications whose data priority under-weighs the current network cost to stop their ongoing data transfers, if any. The network data optimizer 214 can send these start/stop notifications to all applications that are currently engaged, for example any time one or more of the inputs 405 change.

The network data optimizer 214 can be implemented using a deep-learning algorithm trained to achieve the lowest cost possible through diligent management of the start/stop notifications. In applicable scenarios, the network data optimizer 214 can also predict upcoming events. For example, based on vehicle navigation inputs (e.g., known route/destination, current GPS location, speed limits, vehicle speed trends, predicted vehicle trajectory), the network data optimizer 214 can predict that the vehicle may enter a higher cost network in the next 30 minutes and hence proactively instruct all applications whose deadline could come up in the higher cost zone to transmit their data before the vehicle enters the higher cost zone. This way, the network data optimizer 214 can decrease the probability of any data transfers occurring in the higher cost zone. It will be appreciated that on-demand applications, such as user-requested media streaming and navigational updates (e.g., GPS location, traffic conditions), may continue data transfers even in the higher cost zone.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The disclosed processes may begin in response to an event, such as on a predetermined or dynamically determined schedule, on demand when initiated by a user or system administer, or in response to some other event. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A networking system for a vehicle, the networking system comprising:
   at least one transceiver configured to connect to a plurality of networks; and
   one or more processors configured by computer-executable instructions to act as an intermediary between an application executing on a computing system of the vehicle and at least one server remote from the vehicle, by at least:
      determining a data transfer window for transferring data between the application and the at least one server;
      receiving a predetermined navigational route of the vehicle to a geographic destination;
      determining, based on the predetermined navigational route of the vehicle, an expected location of the vehicle during the data transfer window;
      identifying, based on the determined expected location, at least two networks to which the at least one transceiver can connect during the data transfer window;
      selecting, from the at least two networks, a network or combination of networks corresponding to a lowest cost to transfer data between the application and the at least one server; and
      causing the data to be transferred, via the at least one transceiver, between the application and the at least one server, using the selected network or combination of networks during the data transfer window.

2. The networking system of claim 1, wherein the one or more processors are further configured to determine a start time within the data transfer window for transferring the data.

3. The system of claim 2, wherein the start time is later than a beginning of the data transfer window.

4. The system of claim 2, wherein the one or more processors are configured to determine the start time based at least in part on a deep learning model trained to predict optimal data transfer start and stop timings.

5. The system of claim 1, wherein the one or more processors are configured to determine the expected location of the vehicle during the data transfer window based at least in part on historical navigation data associated with the vehicle.

6. The system of claim 1, wherein the one or more processors are configured to determine the expected location of the vehicle during the data transfer window based at least in part on a current speed of the vehicle, a trending speed of the vehicle, one or more speed limits associated with roads along the predetermined navigational route of the vehicle, or one or more speed trends associated with roads along the predetermined navigational route of the vehicle.

7. The system of claim 1, wherein the one or more processors are configured to determine the expected location of the vehicle during the data transfer window based in part on current or predicted traffic conditions associated with roads along the predetermined navigational route of the vehicle.

8. The system of claim 1, wherein the selected network or combination of networks comprises a combination of at least two networks.

9. The system of claim 8, wherein the combination of at least two networks includes a first network corresponding to a lowest cost and a second network corresponding to a next-lowest cost.

10. The system of claim 9, wherein causing the data to be transferred comprises causing a first portion of the data to be transferred using the first network and causing a second portion of the data to be transferred using the second network during a portion of the data transfer window when the first network is unavailable.

11. A computer-implemented method comprising, by one or more processors of a vehicle:
determining a data transfer window for transferring data between an application executing on a computing system of the vehicle and at least one server remote from the vehicle;
receiving a predetermined navigational route of the vehicle to a geographic destination;
determining, based on the predetermined navigational route of the vehicle, an expected location of the vehicle during the data transfer window;
identifying, based on the determined expected location, at least two networks to which at least one transceiver of the vehicle can connect during the data transfer window;
selecting, from the at least two networks, a network or combination of networks corresponding to a lowest cost to transfer data between the application and the at least one server; and
causing the data to be transferred, via the at least one transceiver, between the application and the at least one server, using the selected network or combination of networks during the data transfer window.

12. The method of claim 11, further comprising determining a start time within the data transfer window for transferring the data.

13. The method of claim 12, wherein the start time is later than a beginning of the data transfer window.

14. The method of claim 12, wherein the start time is determined based at least in part on a deep learning model trained to predict optimal data transfer start and stop timings.

15. The method of claim 11, wherein the expected location of the vehicle during the data transfer window is determined based at least in part on historical navigation data associated with the vehicle.

16. The method of claim 11, wherein the expected location of the vehicle during the data transfer window is determined based at least in part on a current speed of the vehicle, a trending speed of the vehicle, one or more speed limits associated with roads along the predetermined navigational route of the vehicle, or one or more speed trends associated with roads along the predetermined navigational route of the vehicle.

17. The method of claim 11, wherein the expected location of the vehicle during the data transfer window is determined based at least in part on current or predicted traffic conditions associated with roads along the predetermined navigational route of the vehicle.

18. The method of claim 11, wherein the selected network or combination of networks comprises a combination of at least two networks.

19. The method of claim 18, wherein the combination of at least two networks includes a first network corresponding to a lowest cost and a second network corresponding to a next-lowest cost.

20. The method of claim 19, wherein causing the data to be transferred comprises causing a first portion of the data to be transferred using the first network and causing a second portion of the data to be transferred using the second network during a portion of the data transfer window when the first network is unavailable.

* * * * *